Patented May 12, 1942

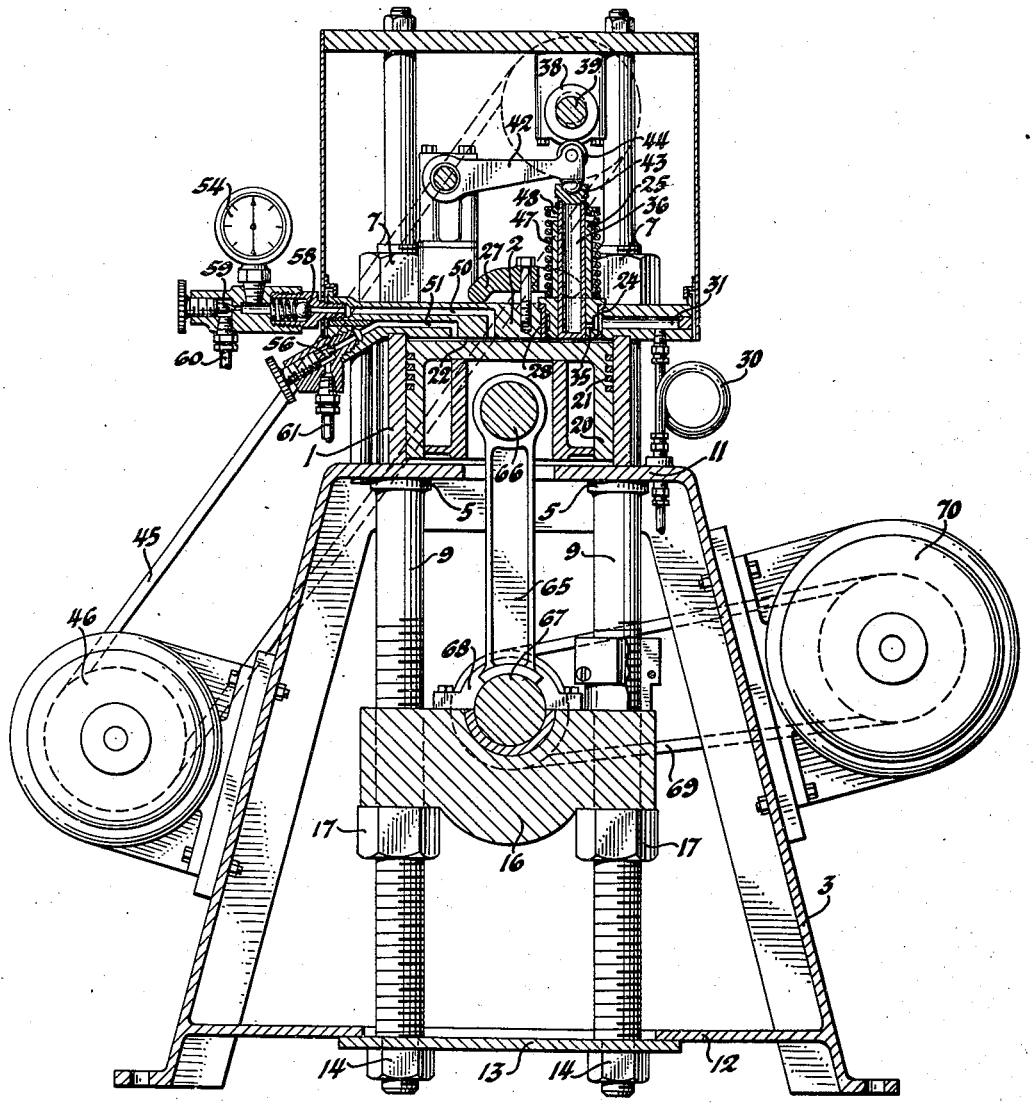

2,282,826

UNITED STATES PATENT OFFICE 2,282,826

FATIGUE TESTING MACHINE

Edward V. Rippingille, Detroit, Mich., assignor to General Motors Corporation, Detroit, Mich., a corporation of Delaware Application November 13, 1939, Serial No. 303,962

1 Claim. (Cl. 265—14)

This invention relates to a machine for applying a high cyclic load to a part to be tested. It relates especially to such a machine capable of applying a load, which may vary from zero or any other desired minimum to a maximum, at high frequency, to a machine element for instance, for the purpose of testing its resistance to fatigue from repeated stressing.

One object of the invention is a hydraulic fatigue testing machine in which a high load is obtained, by pumping a relatively small quantity of fluid at a suitable pressure into a clearance space of small volume between a cylinder and a piston of relatively large area, to which the part to be tested is connected.

Another object of the invention is a hydraulic fatigue testing machine in which the fluid pressure is provided by a plunger pump having combined inlet and relief ports controlled by the plunger, and through which the cylinder pressure is relieved at the end of each stroke of the pump.

Another object of the invention is a machine of the foregoing type with means whereby only the maximum pressure is recorded on a pressure gauge.

A still further object of the invention is a hydraulic fatigue testing machine in which a manually adjustable valve means is provided for controlling the maximum pressure.

The above and other objects of the invention will be apparent as the description proceeds.

The drawing shows a machine of the type described, arranged for fatigue testing a slipper type, engine connecting rod in compression.

The cylinder 1, with its cylinder head 2 is supported on the frame 3 of the testing machine, and is secured thereto between shoulders such as 5, and nuts such as 7 on large bolts such as 9, which pass through the table portion 11 of the frame, and extend therebelow through the base 12 of the frame, to which they are clamped by a plate 13 and nuts such as 14 on the bolts.

An anvil 16 is slidable axially of the bolts 9, and is supported in any desired position between the table and the base portion of the frame 3, by the nuts such as 17.

Within the cylinder 1 is a piston 20, provided with suitable packing rings 21. The piston 20 is almost as long as the cylinder, and there is only a small clearance space 22 between the cylinder head and the piston which has only a very small stroke of a few thousandths of an inch, dependent on the stretching or compression of the parts of the machine and the specimen to be tested, under load.

Mounted in a bore in the cylinder head 2, is a bushing 24, within which, a pump cylinder barrel 25, with an open end extending into the clearance space 22, is secured by a hold down crab 27.

In that surface of the pump cylinder barrel 25 embraced by the bushing 24, is an annular groove 28. An oil supply pipe 30 is connected to a duct 31 in the cylinder head, which extends through the bushing 24 into the annular groove 28.

A plurality of radially disposed combined inlet and relief ports such as 35, extend from the annular groove 28 into the pump cylinder barrel, and are controlled by the hollow plunger 36, which reciprocates therein.

The plunger 36 is actuated on its downward or delivery stroke by a suitable cam 38 on a shaft 39, through the medium of a rocking arm 42, having, a cup and ball connection 43 with the plunger 36, and a roller follower 44 for the cam 38. The shaft 39 is driven by belt 45 from the electric motor 46.

A plunger return spring 47, bearing against a collar 48 on the end of the plunger 36, yieldingly urges the plunger 36 on its upward or return stroke.

Two ducts 50 and 51 in the cylinder head, extend from the clearance space 22 to a pressure gauge 54, and a relief valve 56, respectively. Between the pressure gauge 54 and the clearance space 22, is a ball check valve 58, and beyond the pressure gauge is a screw-down needle type relief valve 59, with a return line 60 to the oil supply (not shown).

The relief valve 56 is of the screw-down needle type, with a return line 61 to the oil supply.

The element to be tested is connected between the piston 20 and the anvil 16. In the example illustrated, the element to be tested is a slipper type connecting rod 65. The gudgeon pin end of the connecting rod is connected to a gudgeon pin 66 in the piston 20. The slipper end of the connecting rod does not bear directly on the anvil 16, but bears on a shaft 67, supported in a bearing 68 on the anvil 16, and driven by belt 69 from an electric motor 70. It will be appreciated that although the shaft 67 is a plain shaft and not a crankshaft, the arrangement enables the working conditions of the connecting rod in an engine to be more closely simulated, and the slipper end bearing of the connecting rod, as well as the connecting rod itself, to be fatigue tested.

The pump plunger 36 is made hollow so as to be as light as possible for minimum inertia.

At the beginning of the downward or delivery stroke of the pump plunger, the inlet and relief ports such as 35 are uncovered by the plunger, and oil flows from the supply pipe 30, through the duct 31 and the annular groove 28, into the pump cylinder barrel 25 and the clearance space 22, the relief valves 56 and 59 being open to permit the egress of air and/or oil from the clearance space 22. As the plunger 36 moves downward on its delivery stroke it closes the ports such as 35, and thereafter throughout the remainder of its delivery stroke, it forces the oil from the cylinder barrel into the clearance space 22. If now the relief valves 56 and 59 are closed, and depending on the resistance to stretching or compression of the parts of the machine and the specimen to be tested, a considerable pressure will be developed in the clearance space 22 and against the piston 20, to stress the connecting rod 65 in compression against the shaft 67 supported by the anvil 16. As before mentioned, the shaft 67 may be revolved by the motor 70, if desired.

On the upward stroke of the plunger, the pressure will be relieved and the ports 35 will again be opened to equalize the pressure in the clearance space 22 with the supply pressure in the pipe 30, or to admit more oil into the clearance space 22 to make up for leakage therefrom.

The foregoing cycle of pressure variation from a minimum to a maximum, will occur on each reciprocation of the plunger 36. In the example illustrated, the speed of the motor 46 and the camshaft 39 is such that the plunger is reciprocated upwardly and downwardly, to repeat the cycle two thousand times a minute, and the pump pressure and the relative areas of the plunger 36 and the piston 20 are such that a compressive load of one hundred thousand pounds is applied to the connecting rod 65 at this rate.

The check valve 58 in the duct 50 between the clearance space 22 and the pressure gauge 54, permits the finger of the pressure gauge to remain steady at the maximum pressure instead of oscillating from zero to maximum on each cycle.

The maximum pressure can be reduced to any desired degree, by opening the relief valve 56 to bleed a requisite amount of oil from the clearance space.

Suitable valve means can be provided in the duct 31 (in known manner not shown), to restrict the outflow through the ports 35 without restricting the inflow therethrough, and thereby maintain in the clearance space 22 any desired minimum pressure higher than the supply pressure.

The shape and speed of rotation of the cam 38 determines the way in which the loading of the test specimen varies cyclically.

It will be appreciated that the invention is not limited to a machine specifically for testing a connecting rod, that it can be used with or without rotation of the shaft 67, and that any other specimen which can be placed between the piston 20 and the anvil 16 can be similarly tested. Furthermore, it will be obvious that by simple modification of the machine, it could be adapted to test specimens in tension, or in both compression and tension, if the test specimen were properly secured to the members 20 and 16.

I claim:

A fatigue testing machine for applying a cyclically varying load at high frequency to a part to be tested, comprising a cylinder, a piston in the cylinder, means for connecting the part to be tested between the piston and another part of the machine, a pump for pumping fluid into the clearance space between the piston and the cylinder head, and means for measuring the pressure therein; said pump being of the plunger type with combined inlet and relief ports controlled by the plunger to relieve the cylinder pressure at the end of each stroke.

EDWARD V. RIPPINGILLE.